United States Patent
Challa et al.

(10) Patent No.: US 7,088,955 B2
(45) Date of Patent: Aug. 8, 2006

(54) METHOD AND APPARATUS FOR ACQUIRING AND TRACKING PILOTS IN A CDMA COMMUNICATION SYSTEM

(75) Inventors: Raghu Challa, San Diego, CA (US); Gilbert Christopher Sih, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 469 days.

(21) Appl. No.: 09/972,514

(22) Filed: Oct. 5, 2001

(65) Prior Publication Data
US 2003/0054768 A1    Mar. 20, 2003

Related U.S. Application Data

(60) Provisional application No. 60/305,987, filed on Jul. 16, 2001.

(51) Int. Cl.
H04B 1/00 (2006.01)
H04B 15/00 (2006.01)

(52) U.S. Cl. .................. 455/63.3; 455/192.2; 455/139; 455/506; 375/344

(58) Field of Classification Search .................. 455/65, 455/67.11, 67.13, 703, 71, 269, 273, 63.1, 455/500, 501, 63.3; 375/148, 150, 316, 346, 375/348, 344; 370/335, 342, 441
See application file for complete search history.

(56) References Cited

U.S. PATENT DOCUMENTS

| | | | |
|---|---|---|---|
| 5,280,472 A * | 1/1994 | Gilhousen et al. | 370/335 |
| 5,640,431 A | 6/1997 | Bruckert et al. | 375/344 |
| 5,808,582 A * | 9/1998 | Woo | 342/357.12 |
| 6,055,231 A | 4/2000 | Mesecher et al. | 370/342 |
| 6,085,104 A * | 7/2000 | Kowalski et al. | 455/506 |
| 6,259,401 B1 * | 7/2001 | Woo | 342/357.12 |
| 6,278,725 B1 * | 8/2001 | Rouphael et al. | 375/148 |
| 6,335,953 B1 * | 1/2002 | Sanderford et al. | 375/344 |
| 6,560,209 B1 * | 5/2003 | Alamouti et al. | 370/330 |
| 6,608,826 B1 * | 8/2003 | Mesecher et al. | 370/342 |
| 6,608,858 B1 * | 8/2003 | Sih et al. | 375/147 |
| 6,711,219 B1 * | 3/2004 | Thomas et al. | 375/346 |
| 6,728,202 B1 * | 4/2004 | Sayeed et al. | 370/208 |
| 6,760,573 B1 * | 7/2004 | Subrahmanya et al. | 455/192.2 |
| 6,768,727 B1 * | 7/2004 | Sourour et al. | 370/335 |
| 2004/0009757 A1 * | 1/2004 | Subrahmanya et al. | 455/134 |

* cited by examiner

*Primary Examiner*—Binh K. Tieu
(74) *Attorney, Agent, or Firm*—Philip R. Wadsworth; Charles D. Brown; George C. Pappas

(57) ABSTRACT

Techniques to acquire and track pilots in a CDMA system. In an aspect, frequency acquisition of a number of signal instances (i.e., multipaths) in a received signal may be achieved concurrently based on a frequency control loop (RAFC) maintained for each finger processor of a rake receiver. Upon successful acquisition, frequency tracking of acquired multipaths may be achieved based on a combination of a frequency control loop (VAFC) maintained for an oscillator used for downconverting the received signal and the RAFCs for the finger processors. In a tracking mode, the VAFC tracks the average frequency of the acquired multipaths by adjusting the frequency of the oscillator. The RAFC of each finger processor tracks the residual frequency error (e.g., due to Doppler frequency shift) of the individual acquired multipath by adjusting the frequency of a complex sinusoidal signal used in a rotator within the finger processor.

46 Claims, 10 Drawing Sheets

METHOD AND APPARATUS FOR ACQUIRING AND TRACKING PILOTS IN A CDMA COMMUNICATION SYSTEM

This application claims the benefit of Provisional Application No. 60/305,987, filed on Jul. 7, 2001.

BACKGROUND

1. Field

The present invention relates to data communication, and more particularly to techniques for acquiring and tracking signals (e.g., pilots) in a CDMA communication system.

2. Background

Wireless communication systems are widely deployed to provide various types of communication such as voice, data, and so on, for a number of users. These systems may be based on code division multiple access (CDMA), time division multiple access (TDMA), frequency division multiple access (FDMA), or some other multiple access techniques. CDMA systems may provide certain advantages over other types of system such as increased system capacity. A CDMA system is typically designed to conform to one or more standards, such as IS-95, cdma2000, IS-856, W-CDMA, and TS-CDMA standards, all of which are known in the art and incorporated herein by reference.

A terminal in a CDMA system needs to acquire signals transmitted from one or more base stations in order to receive or exchange data. In many CDMA systems, a pilot is transmitted from each base station to assist the terminals perform a number of functions. The pilot is typically generated based on a known data pattern (e.g., a sequence of all zeros) and using a known signal processing scheme (e.g., covered with a Walsh code of zero and spread with a known pseudo-random noise (PN) sequence). For IS-95 and cdma2000 systems, each base station is assigned a specific PN offset that is different from those of neighboring base stations to allow the terminals to distinguish the individual base stations. The pilots from the base stations may be used at the terminals for acquisition, frequency and timing synchronization, channel estimation, coherent demodulation of data transmission, and so on.

The acquisition of a pilot is made challenging due to various phenomena. First, the pilot is distorted by noise and interference in the communication link, which can make detection of the pilot difficult at a terminal. Second, due to obstructions and artifacts in the transmission environment, a transmitted pilot typically reaches the terminal via a number of signal paths, and the received signal at the terminal normally includes multiple instances of the pilot at various amplitudes, phases, and delays. Third, since the terminal may not be certain of its frequency relative to the system, the received signal may be downconverted with a frequency error that needs to be acquired and tracked. And fourth, movement by the terminal creates a Doppler shift in the frequency of the received pilot, causing the pilot's frequency to be offset from a nominal (expected) value. The signal instances in the received signal may thus be associated with different (and possibly large) frequency errors due to downconversion frequency error and/or Doppler frequency error.

There is therefore a need in the art for techniques to effectively acquire and track signals (e.g., pilots) over frequency errors in a CDMA communication system.

SUMMARY

Aspects of the invention provide techniques to effectively acquire and track pilots in a CDMA system. In an aspect, frequency acquisition of a number of signal instances (i.e., multipaths) in a received signal may be achieved concurrently based on a frequency control loop (RAFC) maintained for each finger processor of a rake receiver. Upon successful acquisition, frequency tracking of one or more acquired multipaths may be achieved based on a combination of (1) a frequency control loop (referred to as "VAFC") maintained for a precision oscillator used for downconverting the received signal and (2) the frequency control loops (referred to as "RAFCs") for the finger processors assigned to the acquired multipaths. These various types of frequency control loops are described in further detail below.

In a tracking mode, the VAFC may be used to track the average frequency of the acquired multipaths by adjusting the frequency of the oscillator. (The local oscillator (LO) signals used to downconvert the received signal from RF to baseband are locked to the oscillator frequency.) The RAFC of each finger processor may then be used to track the residual frequency error (e.g., due to Doppler frequency shift) of the individual acquired multipath by adjusting the frequency of a complex sinusoidal signal used in a rotator within the finger processor. The combination of RAFC and VAFC reduces the frequency error observed in the data demodulation path in each finger processor to zero.

A specific embodiment of the invention provides a method of acquiring signal instances (i.e., multipaths) in a received signal in a wireless (e.g., CDMA) communication system. In accordance with the method, frequency acquisition is performed on each of one or more candidate multipaths with a respective first frequency control loop (RAFC). Upon successful acquisition on at least one candidate multipath, the frequency error of each acquired multipath may be transferred from the RAFC to a second frequency control loop (VAFC), and the average frequency of the at least one acquired multipath is tracked with the VAFC. The residual frequency error of each acquired multipath may then be tracked with the RAFC.

Thereafter, frequency acquisition may be performed on each of one or more additional candidate multipaths based on a respective RAFC. During this frequency acquisition, the contributions from the RAFCs for the additional candidate multipaths are omitted from the VAFC, which is tracking the average frequency of the previously acquired multipaths. Upon successful acquisition on at least one additional candidate multipath, the contributions from the RAFC of the at least one additional acquired multipath are provided to the VAFC, which then tracks the average frequency of all acquired multipaths.

The acquisition and tracking techniques described herein may be used for the forward link, and possibly the reverse link, in various CDMA systems such as IS-95, cdma2000, W-CDMA, and TS-CDMA. The invention further provides other methods, demodulators, receiver units, terminals, and other elements and devices that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
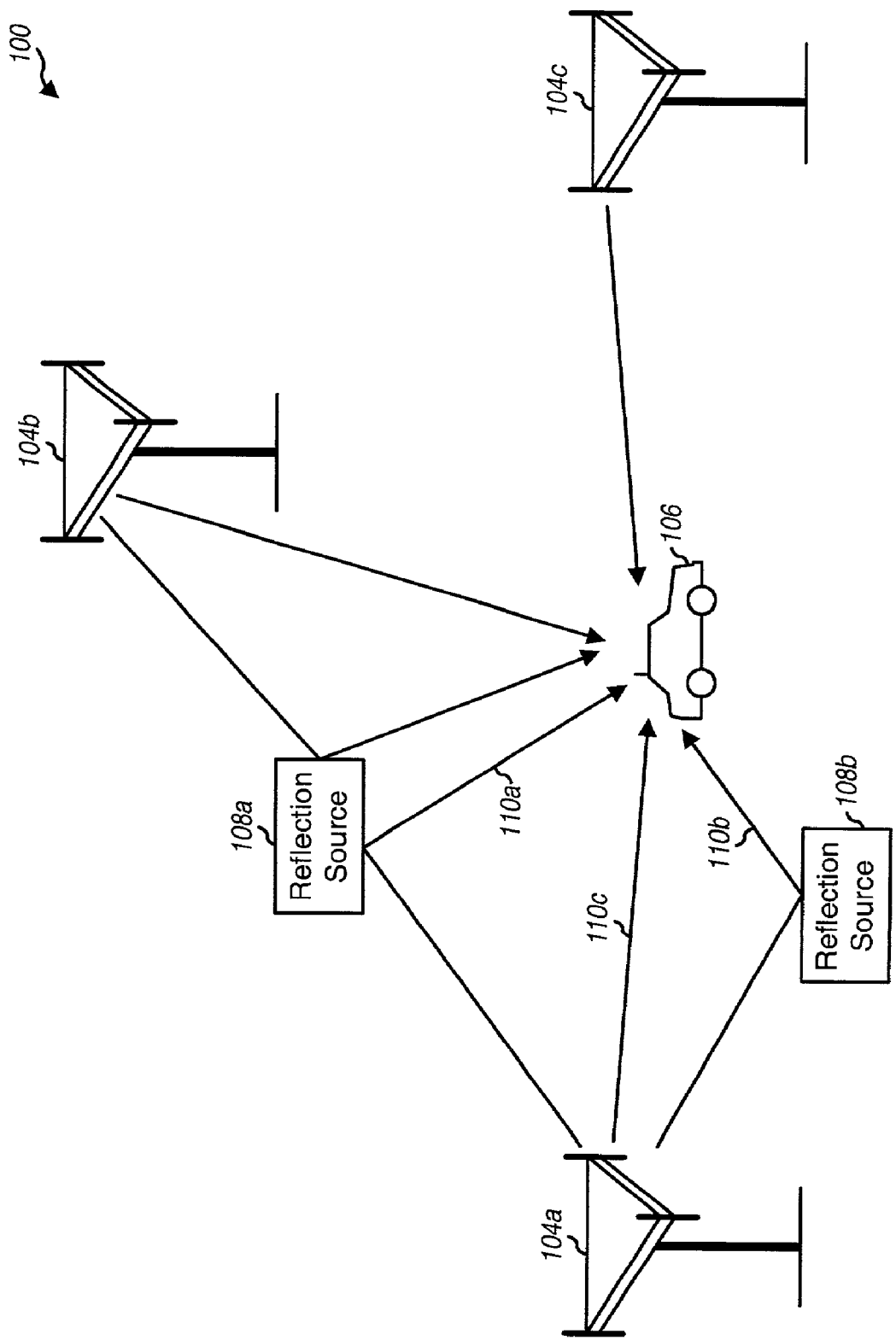
FIG. 1 is a diagram of a wireless communication system.

FIG. 1 is a diagram of a wireless communication system 100 wherein various aspects and embodiments of the invention may be implemented. System 100 may be designed to support one or more CDMA standards such as IS-95, cdma2000, IS-856, W-CDMA, and TS-CDMA, all of which are known in the art and incorporated herein by reference. System 100 provides communication for a number of cells, with each cell being serviced by a corresponding base station 104. Various terminals 106 are dispersed throughout the system (only one terminal is shown in FIG. 1 for simplicity). Each terminal 106 may communicate with one or more base stations 104 on the forward and reverse links at any given moment, depending on whether or not the terminal is active and whether or not it is in soft handoff. The forward link (i.e., downlink) refers to transmission from the base station to the terminal, and the reverse link (i.e., uplink) refers to transmission from the terminal to the base station.

A signal transmitted from a base station may reach the terminal via one or multiple signal paths. These signal paths may include a straight path (e.g., signal path 110c) and/or reflected paths (e.g., signal paths 110a and 110b). A reflected path is created when the transmitted signal is reflected off a reflection source 108 and arrives at the terminal via a different path than the line-of-sight path. Reflection sources 108 are typically artifacts in the environment in which the terminal is operating (e.g., buildings, trees, or some other structures). As shown in FIG. 1, the received signal at the terminal may comprise a number of signal instances (or multipaths) from one or more base stations. The reverse link is also similarly affected by this multipath phenomenon.

The pilot acquisition and tracking techniques of the invention may be implemented on the forward link, and possibly the reverse link, in various wireless (e.g., CDMA or spread spectrum) communication systems. For clarity, these techniques are specifically described for the forward link in IS-95 and cdma2000 systems.

Figure 2:
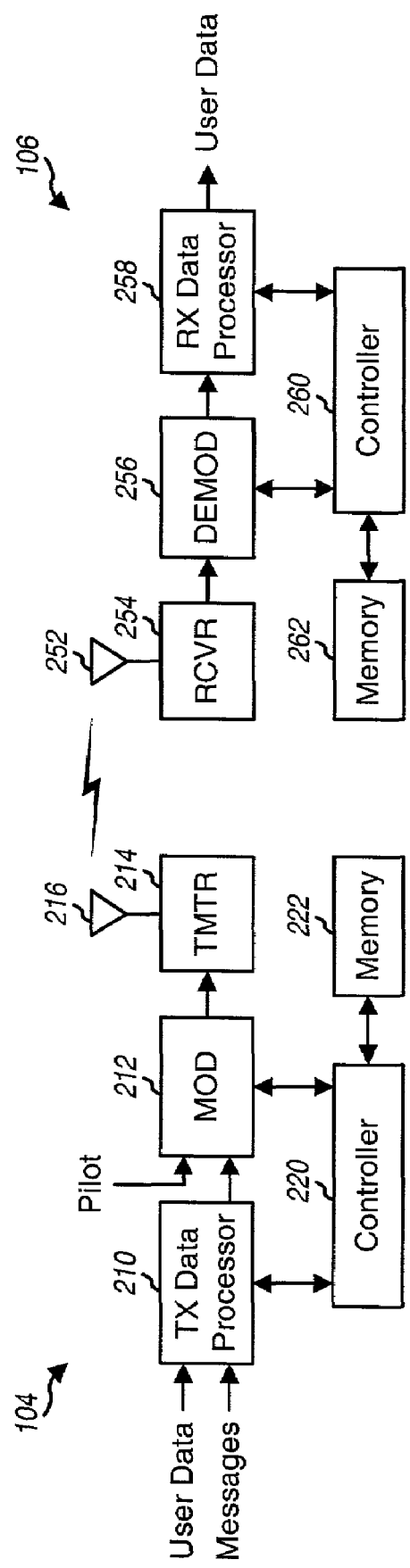
FIG. 2 is a simplified block diagram of an embodiment of a base station and a terminal.

FIG. 2 is a simplified block diagram of an embodiment of base station 104 and terminal 106. On the forward link, at base station 104, a transmit (TX) data processor 210 receives various types of "traffic" such as user-specific data, messages, and so on. TX data processor 210 then formats, possibly interleaves, and codes the different types of traffic based on one or more coding schemes to provide coded data. Typically, different types of traffic are coded using different coding schemes.

A modulator (MOD) 212 receives pilot data and the coded data from TX data processor 210, and further processes the received data to provide modulated data. For IS-95 and cdma2000, the processing by modulator 212 includes (1) channelizing the different types of data onto their respective code channels (e.g., traffic, sync, paging, and pilot channels) with different Walsh codes, (2) summing the channelized data for all code channels, and (3) spreading the summed data with a complex pseudo-random noise (PN) sequence at a particular PN offset assigned to the base station. The pilot is typically channelized with a Walsh code of zero.

The modulated data is then provided to a transmitter (TMTR) 214 and conditioned (e.g., converted to one or more analog signals, amplified, filtered, and quadrature modulated) to provide one or more forward modulated signals, which are transmitted from one or more antennas 216 over a wireless link to the terminals.

At terminal 106, the forward modulated signals from one or more base stations are received by an antenna 252 and provided to a receiver (RCVR) 254. Receiver 254 conditions and digitizes the received signal to provide data samples. A demodulator (DEMOD) 256 then processes the data samples to provide recovered symbols. For IS-95 and cdma2000, the processing by demodulator 256 includes (1) despreading the data samples with the (complex-conjugate) PN sequence used to spread the data at the base station, (2) channelizing the different types of data in the despread samples onto their respective code channels with the proper Walsh codes, and (3) coherently demodulating the channelized data with pilot estimates recovered from the received signal. Demodulator 256 may implement a rake receiver that can process multiple signal instances (or multipaths) in the received signal, as described below.

A receive (RX) data processor 258 then receives and decodes the symbols from demodulator 256 to recover the user-specific data and messages transmitted on the forward link. The processing by demodulator 256 and RX data processor 258 is complementary to that performed by modulator 212 and TX data processor 210, respectively, at base station 104.

Controllers 220 and 260 may direct various operations at the base station and terminal, respectively. Memory units 222 and 262 may be used to store data and codes for controllers 220 and 260, respectively.

Figure 3:
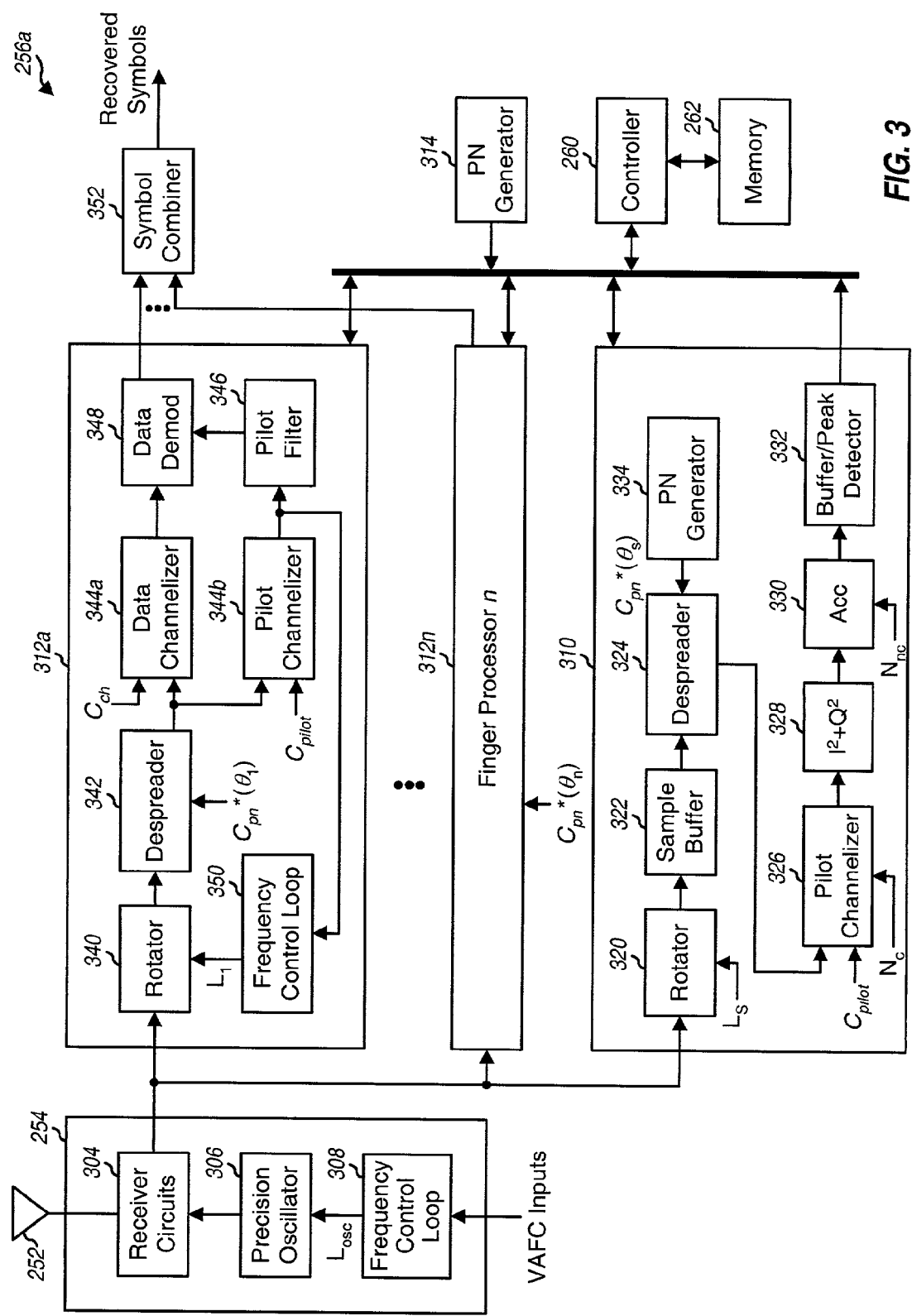
FIG. 3 is a block diagram of a rake receiver capable of implementing various aspects and embodiments of the invention.

FIG. 3 is a block diagram of a rake receiver 256a capable of implementing various aspects and embodiments of the invention. Rake receiver 256a may be used to implement demodulator 256 in FIG. 2. Rake receiver 256a includes a searcher 310, a number of (e.g., $M_f$=8) finger processors 312, and a symbol combiner 352.

Within receiver 254, receiver circuits 304 condition (e.g., filter and amplify) the received signal, quadrature downconvert the conditioned signal, and digitize the downconverted signal to provide complex data samples. The quadrature downconversion and digitization may be performed in various manners, depending on the specific design of receiver 254. In one receiver design, the conditioned signal is quadrature downconverted to baseband (or near baseband), and the baseband signals are digitized to provide the data samples. In another receiver design, the conditioned signal is downconverted to an intermediate frequency (IF), digitized, and digitally quadrature downconverted to baseband to provide the data samples.

The downconversion of the received signal from RF to baseband is typically performed based on one or more local oscillator (LO) signals locked in frequency to a reference clock from a precision oscillator 306. This oscillator may be implemented as a voltage-controlled temperature-compensated crystal oscillator (VCTCXO) or some other oscillator design. The frequency of the reference clock is controlled by an oscillator frequency control, $L_{osc}$, provided by a frequency control loop 308. The frequency control for receiver 254 is described in further detail below.

Searcher 310 is used to search for strong multipaths in the received signal and to provide an indication of the strength and timing of each found multipath that meets a set of criteria. Each finger processor 312 may then be assigned to process a respective multipath of interest (e.g., a multipath of sufficient strength). In an aspect, finger processors 312 are also used for pilot acquisition and tracking, as described below.

The search for multipaths is typically performed based on the pilot included in each forward modulated signal. To search for strong multipaths, the data samples are correlated with a locally generated PN sequence at various chip or sub-chip offsets (i.e., various PN phases). Due to the pseudo-random nature of the PN sequence, the correlation of the data samples with the locally generated PN sequence should be low, except when the phase of the PN sequence is approximately aligned with that of a multipath, in which case the correlation results in a high value.

In the embodiment shown in FIG. 3, within searcher 310, the complex data samples are provided to a rotator 320, which performs a complex multiply of the data samples with a complex sinusoidal signal to provide frequency-translated data samples. The frequency of the complex sinusoidal signal is determined by a frequency control signal, $L_S$, and may be set to zero or some other value. Rotator 320 may be used to remove phase rotation in the data samples due to Doppler frequency shift and/or downconversion frequency error.

Since the same block of frequency-translated data samples may be evaluated at various PN phases, each of which corresponds to a hypothesis for a multipath, the samples are stored to a sample buffer 322. For each hypothesis to be evaluated by the searcher, the stored data samples from sample buffer 322 are provided to a despreader 324, which also receives from a PN generator 334 a complex-conjugate PN sequence, $C_{pn}^*(\theta_s)$, having a specific phase $\theta_s$ corresponding to the hypothesis being evaluated. Despreader 324 despreads the frequency-translated data samples with the received PN sequence to provide despread samples.

To detect a pilot, a pilot channelizer 326 first multiplies the despread samples with the pilot channelization code, $C_{pilot}$ (e.g., Walsh code zero for IS-95 and cdma2000), and then (coherently) accumulates the decovered pilot samples over $N_c$ PN chips to provide a complex pilot symbol. The coherent accumulation time interval ($N_c$) is typically an integer multiple of the pilot channelization code length.

The pilot symbols are then squared by a squarer 328, and $N_{nc}$ squared pilot symbols are (non-coherently) accumulated by an accumulator 330 to provide a pilot energy estimate, $E_{pilot}$, for the hypothesis being evaluated, which is then stored in a buffer/peak detector 332. After all hypotheses have been evaluated, buffer/peak detector 332 provides a set of detected peaks for the evaluated hypotheses.

Finger processors 312 are used for data demodulation and may further be used for pilot acquisition and tracking. In the embodiment shown in FIG. 3, within each finger processor 312, the complex data samples are provided to a rotator 340, which performs a complex multiply of the data samples with a complex sinusoidal signal to provide frequency-translated data samples, similar to that described above for the searcher. Each multipath may be associated with a different Doppler frequency shift, and rotator 340 attempts to remove the phase rotation in the assigned multipath due to Doppler frequency shift and downconversion frequency error. The frequency of the complex sinusoidal signal used within rotator 340 is an estimate of the frequency error of the assigned multipath, and may be determined by a frequency control loop 350.

The frequency-translated data samples from rotator 340 are provided to a despreader 342, which also receives (e.g., from a PN generator 314) a complex-conjugate PN sequence, $C_{pn}^*(\theta_m)$, having a phase $\theta_m$ corresponding to the arrival time of the assigned multipath as previously identified by searcher 310. Despreader 342 despreads the frequency-translated data samples with the received PN sequence to provide despread samples.

To recover the pilot, a pilot channelizer 344b first multiplies the despread samples with the pilot channelization code, $C_{pilot}$, and further accumulates the decovered pilot samples over a particular accumulation time interval to provide pilot symbols. A pilot filter 346 then filters the pilot symbols to provide filtered pilot symbols (i.e., pilot estimates).

To recover the data on a particular code channel, a data channelizer 344a first multiplies the despread samples with the channelization code, $C_{ch}$, used for the code channel being recovered, and further accumulates the decovered data samples over the length of the channelization code, $C_{ch}$, to provide data symbols. A data demodulator 348 then demodulates the data symbols with the pilot estimates to provide demodulated symbols, which are then provided to symbol combiner 352. Symbol combiner 352 combines the demodulated symbols from all finger processors 312 assigned to process the received signal, and provides recovered symbols to RX data processor 258. The data demodulation and symbol combining may be achieved as described in U.S. Pat. Nos. 5,764,687 and 5,490,165, which are incorporated herein by reference.

As shown in FIG. 1, the received signal at the terminal may include a number of multipaths from one or more base stations. If the terminal is moving, then the Doppler frequency shift for each multipath may be different and possibly large, depending on the terminal's velocity and direction of movement. The terminal is then tasked with acquiring the individual frequency of each of a number of multipaths having sufficient signal strength, and to thereafter track the frequency of the multipaths that have been acquired.

In accordance with an aspect of the invention, frequency acquisition of a number of multipaths may be achieved concurrently based on frequency control loop 350 maintained for each finger processor, and frequency tracking of the acquired multipaths may be achieved based on a combination of frequency control loop 308 for the precision oscillator 306 and the frequency control loops 350 for the finger processors.

In a tracking mode, frequency control loop 308 may be used to track the average frequency of the acquired multipaths by adjusting the frequency of the oscillator. The LO signals used in the downconversion of the received signal from RF to baseband are locked to the oscillator frequency. Each frequency control loop 350 may be used to track the residual frequency error (e.g., due to Doppler frequency shift) of the individual assigned multipath by adjusting the frequency of the complex sinusoidal signal used within the rotator. The combination of loops 308 and 350 reduces the frequency error observed in the data demodulation path in each finger processor to zero by (1) tracking the average frequency of the acquired multipaths with the oscillator and (2) tracking the residual frequency error in each multipath with the rotator, as described below.

Figure 4:
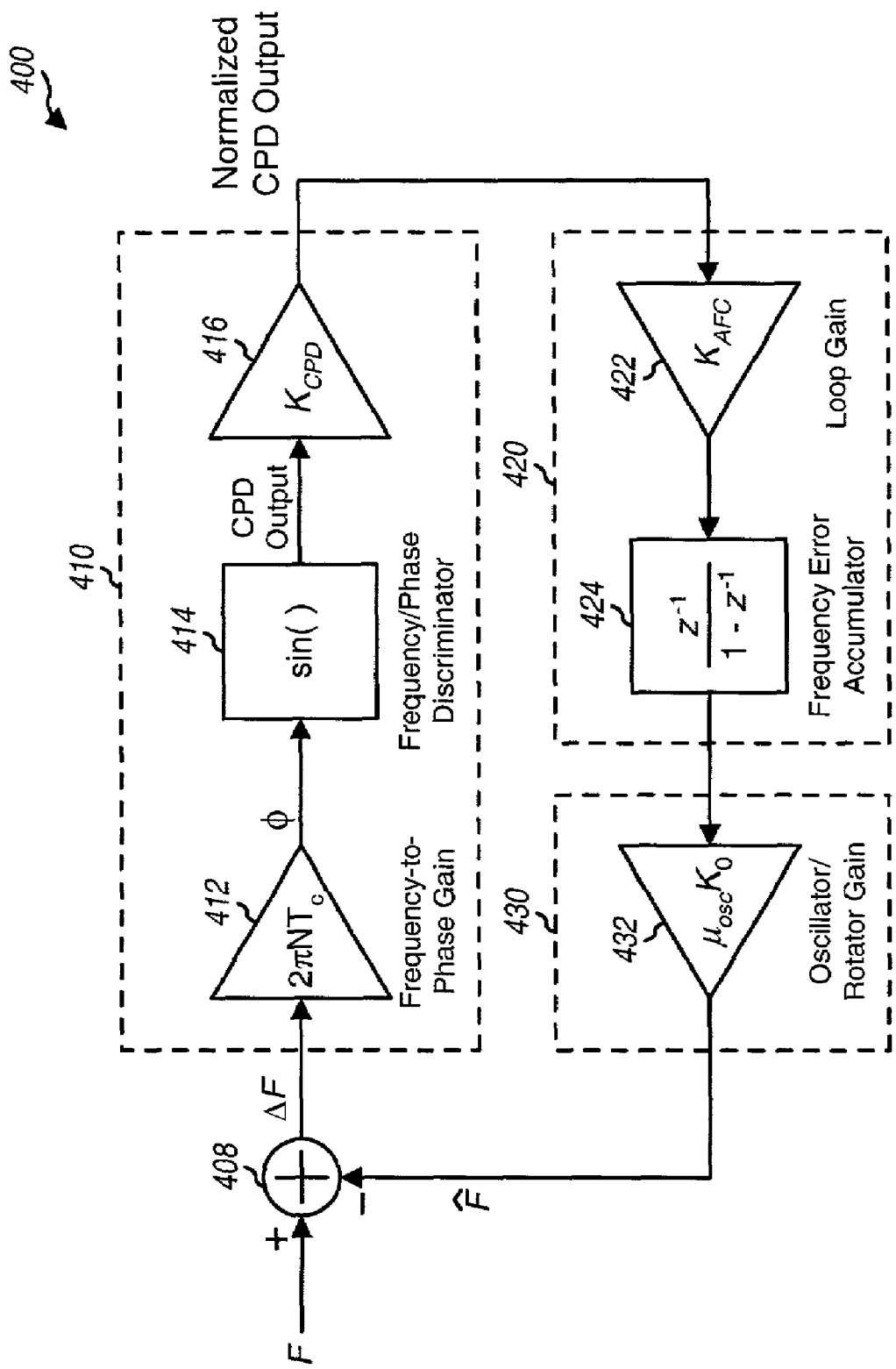
FIG. 4 is a diagram of a model for an automatic frequency control (AFC) loop.

FIG. 4 is a diagram of a model 400 for an automatic frequency control loop. Model 400 may be used for the automatic frequency control of the oscillator ("VAFC") and may also be used for the automatic frequency control of the rotator ("RAFC") within each finger processor.

Model 400 includes a discriminator 410, a loop filter 420, and an oscillator/rotator 430. The input frequency, F, of the received signal instance is subtracted from the estimated input frequency, $\hat{F}$, by a summer 408, and the frequency error, $\Delta F$, is provided to discriminator 410. Within discriminator 410, element 412 represents the scaling to convert from frequency to phase, element 414 represents the transfer function of the specific discriminator used for frequency detection (e.g., a "cross-product discriminator" or CPD), and element 416 represents the scaling to provide a normalized CPD output. Within loop filter 420, element 422 represents the gain for the loop filter and element 424 models an accumulator used to accumulate the frequency error. Within oscillator/rotator 430, element 432 represents the gain of an oscillator or rotator that provides the estimated frequency, $\hat{F}$. The constant $\mu_{osc}$ models the effect of variations in the sensitivity (or transfer gain) of the oscillator, and is defined as the ratio of the actual oscillator sensitivity over the average oscillator sensitivity (e.g., $\mu_{osc} \in [1\ 2]/1.5$). For a digital rotator in the RAFC, the constant $\mu_{osc}$ is set to one (1).

Figure 5:
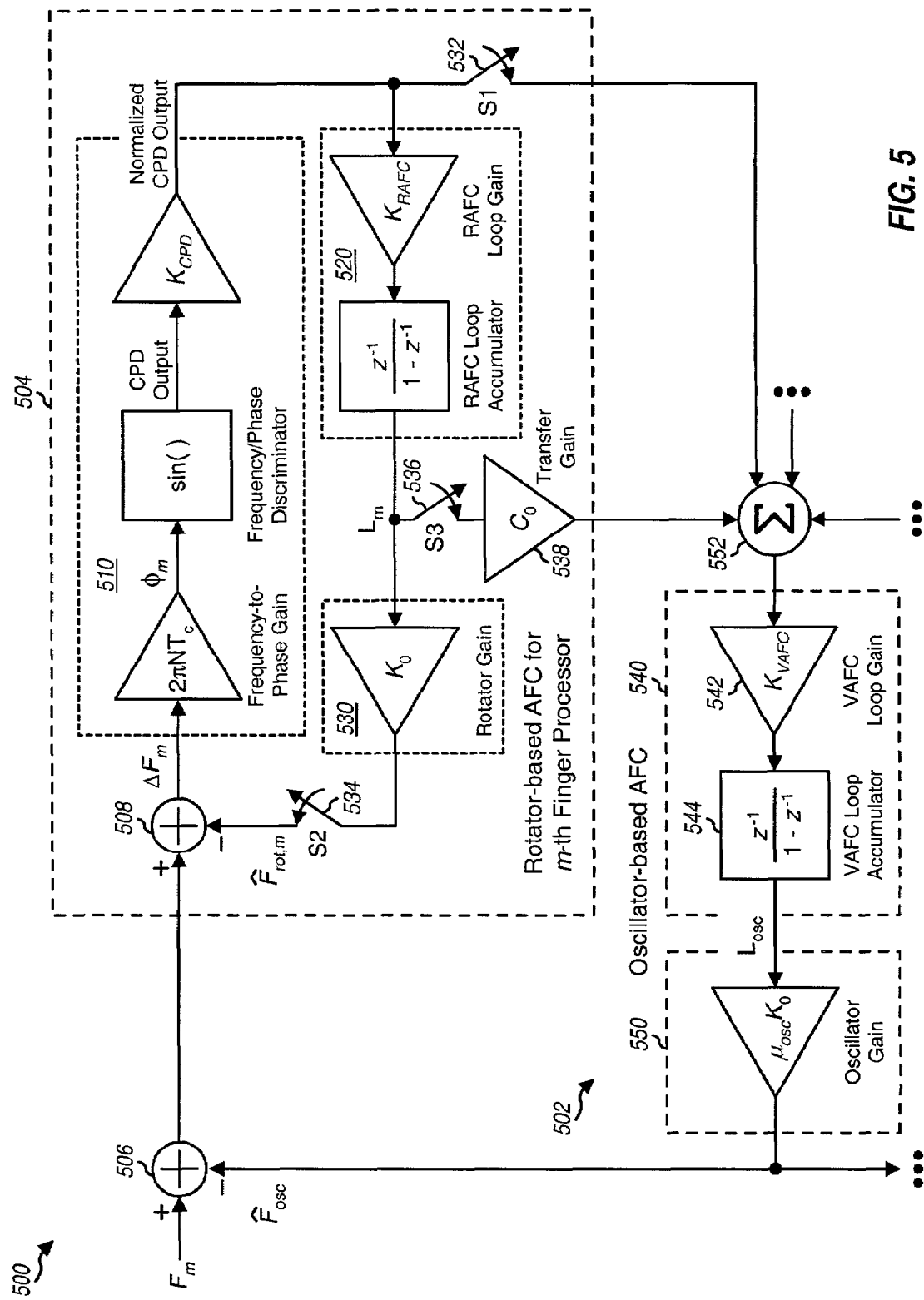
FIG. 5 is a diagram of a model for the automatic frequency control of a precision oscillator ("VAFC"), a rotator ("RAFC"), or both the oscillator and rotator ("RVAFC")

FIG. 5 is a diagram of a model 500 for the automatic frequency control of the precision oscillator ("VAFC"), the rotator ("RAFC"), or both the oscillator and rotator ("RVAFC"). Model 500 includes a VAFC unit 502 and a number of RAFC units 504, one RAFC unit for each finger processor of the rake receiver (only one RAFC unit 504 is shown in FIG. 5 for simplicity). Each RAFC unit 504 includes a discriminator 510, a loop filter 520, and a rotator 530. VAFC unit 502 includes a loop filter 540 and an oscillator 550, and further utilizes discriminator 510 in the RAFC unit of one or more finger processors.

The input frequency, $F_m$, of the m-th multipath in the received signal is initially subtracted from the downconversion frequency, $\hat{F}_{osc}$, by a summer 506, and the downconverted frequency is provided to RAFC unit 504 of the finger processor assigned to process the m-th multipath. Within RAFC unit 504, the downconverted frequency is further subtracted from the rotator frequency, $\hat{F}_{rot,m}$, by a summer 508, and the frequency error, $\Delta F_m$, of the m-th multipath is provided to discriminator 510. Discriminator 510 detects the frequency error and provides a normalized CPD output, $CPD_m$, which is filtered by loop filter 520 to provide a frequency control, $L_m$, for rotator 530. The frequency, $\hat{F}_{rot,m}$, of the complex sinusoidal signal used within rotator 530 is adjusted based on the rotator frequency control, $L_m$.

Depending on the particular AFC mode selected, the normalized CPD output from zero, one, or multiple RAFC units is provided to loop filter 540 and filtered to provide a frequency control, $L_{osc}$, for oscillator 550. The downconversion frequency, $\hat{F}_{osc}$, is adjusted based on the oscillator frequency control, $L_{osc}$.

Switches and gain elements are provided in model 500 to configure the automatic frequency control to operate in one of three AFC modes—RAFC, VAFC, and RVAFC. Each RAFC unit 504 includes a switch S1 532 that couples the normalized CPD output to a summer 552, a switch S2 534 that couples rotator 530 to summer 508, and a switch S3 536 that couples the output of loop filter 520 of the RAFC unit to a gain element 538 that further couples to summer 552. Table 1 shows the switch configuration and description for the three AFC modes.

TABLE 1

| AFC Mode | Switch Configuration | | | Description |
|---|---|---|---|---|
| | S1 | S2 | S3 | |
| RAFC | Off | On | Off | The rotator-based AFC of each finger processor corrects for all frequency error on the assigned multipath (i.e., the Doppler frequency shift plus the downconversion frequency error). The demodulation path of each finger processor sees negligible resultant Doppler frequency error. |
| VAFC | On | Off | Off | The oscillator-based AFC corrects for the average of all frequency errors (including the average Doppler frequency error) on all "enabled" finger processors. The demodulation path of each finger processor sees a non-zero residual Doppler frequency error. |
| RVAFC | On | On | On | The oscillator-based AFC corrects for the average frequency error while the rotator-based AFC of each finger processor corrects for the residual frequency error (e.g., due to Doppler shift) on the assigned multipath. The demodulation path of each finger processor sees negligible resultant Doppler frequency error. |

In the RAFC mode, switches S1 and S3 for all RAFC units are opened (Off) and switch S2 in each RAFC unit is closed (On). The oscillator frequency control is set to a particular value to provide a nominal downconversion frequency. The rotator in each finger processor is used to correct for all frequency error in the assigned multipath.

In the VAFC mode, switches S2 and S3 for all RAFC units are opened (Off) and switches S1 for the RAFC units of all "enabled" finger processors are closed (On). An enabled finger processor is one whose frequency error contributions are used to derive the frequency control for the oscillator. The VAFC unit tracks the average frequency of all multipaths processed by the enabled finger processors. However, since the RAFC units are turned off, the demodulation path for each enabled finger processor sees a non-zero residual frequency error, which is the difference between that multipath's Doppler frequency error and the average frequency error for the multipaths being tracked by the VAFC.

In the RVAFC mode, switches S1, S2, and S3 for the RAFC units of all enabled finger processors are closed (On). The VAFC unit tracks the average frequency of all multipaths processed by the enabled finger processors (i.e., the "acquired multipaths"), and the RAFC unit for each enabled finger processor tracks the residual frequency error on its assigned multipath. The RVAFC mode may thus be used to simultaneously track the frequencies of up to $M_f$ multipaths (i.e., $F_m$ for m=1, 2, ... $M_f$) while minimizing the individual frequency error observed by the demodulation path on each enabled finger processor.

The $M_f$ finger processors of the rake receiver may also be concurrently operated in a number of AFC modes. For example, the RVAFC mode may be used for one or more finger processors enabled to track one or more acquired multipaths, and the RAFC mode may be used for one or more other finger processors assigned to acquire one or more new candidate multipaths. The dual AFC modes may be advantageously used to track previously acquired multipaths while concurrently attempting to acquire new multipaths, as described below. This design allows each finger processor to be flexibly operated to either acquire or track a multipath, and further allows some finger processors to acquire new multipaths without disturbing the tracking of the acquired multipath by other finger processors.

As shown in FIG. 5, when all switches S1, S2, and S3 are turned On, the demodulation path for each finger processor sees two successive corrections on the assigned multipath's incoming frequency, $F_m$. The first frequency correction is with the downconversion frequency, $\hat{F}_{osc}$, provided by the VAFC unit. The downconversion frequency is adjusted based on the accumulated average frequency error from all enabled finger processors. The second frequency correction occurs in the rotator of each finger processor, with the rotator frequency, $\hat{F}_{rot,m}$, being an estimate of the residual frequency error left on the assigned multipath after the VAFC unit corrects for the average frequency error.

The RAFC, VAFC, and RVAFC are described in further detail below. The AFC modes described above may be advantageously used in the acquisition and tracking of multiple pilot instances in a CDMA system.

The RAFC and VAFC may each be designed with multiple loop modes, with each loop mode designed for specific operating conditions. These loop modes tradeoff between the speed and pull-in range of the loop with the noise in the loop. For example, a loop mode 2 having a wider loop bandwidth may be used for faster acquisition of a multipath when noise is not as important a consideration, and a loop mode 0 having a more narrow loop bandwidth may be used to provide reduced noise during tracking. The various loop modes may be associated with the same or different discriminator designs, the same or different inputs to the discriminator, the same or different outputs from the discriminator, and so on. The particular loop mode to be used may also be selected based on the expected operating conditions. For example, a wide loop bandwidth may be used if the pilots are expected to have high $E_c/I_o$, and a more narrow loop bandwidth may be used if the pilots are expected to have low $E_c/I_o$.

Table 2 shows three loop modes for the RAFC and VAFC, in accordance with one specific embodiment. In this embodiment, the loop modes differ in the inputs to the discriminator (CPD) and the processing after the discriminator. In the table, DPC is the length of a digital signal processing cycle (in PN chips).

TABLE 2

| Loop Mode | Inputs to CPD | Description |
|---|---|---|
| 0 | Filtered pilot symbols of length DPC chips. No averaging after CPD. | Use for the tracking mode. Slowest and least noisy. Pull-in range < pilot filter bandwidth in Hz. |
| 1 | Unfiltered pilot symbols of length DPC chips. No averaging after CPD. | Use just before entering the tracking mode. Faster than mode 0 but more noisy. Pull-in range $<1/(4 \cdot T_c \cdot DPC)$ KHz. |

TABLE 2-continued

| Loop Mode | Inputs to CPD | Description |
|---|---|---|
| 2 | Unfiltered pilot symbols of length 64 chips. Averaged outputs of CPDs over DPC/64. | Use for acquisition. Fastest but most noisy. Pull-in range $<1/(4 \cdot T_c \cdot .64) = 4.8$ KHz. |

The unfiltered pilot symbols may be provided by pilot channelizer 344b in FIG. 3, and the filtered pilot symbols may be provided by pilot filter 346.

Figure 6:
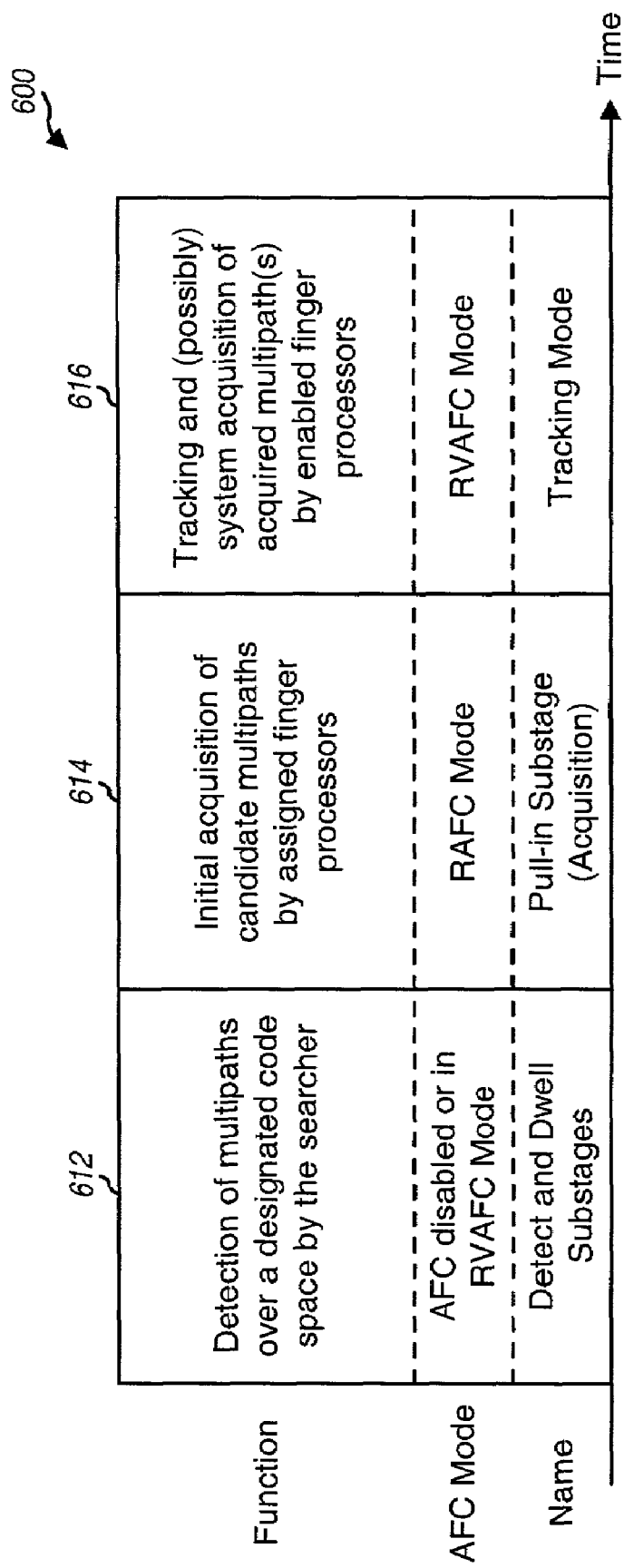
FIGS. 6 and 7 are a diagram and a flow diagram, respectively, of an embodiment of a process to search for, acquire, and track pilots in a CDMA system.

FIG. 6 is a diagram that illustrates various parts of a process 600 to search for, acquire, and track pilots, in accordance with an embodiment of the invention. Initially, a designated code space is searched by a searcher to detect for peaks that may be indicative of strong multipaths in the received signal (block 612). This function may be achieved via a detect and dwell substage (described below). The AFC (i.e., the RAFC and VAFC) may be disabled (if no multipaths are currently being tracked) or the AFC may be operated in the RVAFC mode (if at least one multipath is currently being tracked).

Initial acquisition is then performed on a set of one or more candidate multipaths by respective assigned finger processors (block 614). This function may be achieved via a pull-in substage and is also simply referred to as "acquisition". The AFC is operated in the RAFC mode and each assigned finger processor attempts to acquire the frequency of the assigned multipath.

Upon successful acquisition of at least one candidate multipath in block 614, the acquired multipath(s) are tracked by their respective enabled finger processor(s), and system acquisition may be performed on each acquired multipath (block 616). This function may be performed in the tracking mode. The AFC is operated in the RVAFC mode with the VAFC tracking the average frequency of the acquired multipaths and the RAFC of each enabled finger processor tracking the residual frequency error of its assigned multipath.

Acquisition and tracking are typically achieved for both the frequency and timing of a multipath. However, for simplicity, only frequency acquisition and tracking are described herein. The detect, dwell, and pull-in substages and various aspects of process 600 are described in further detail below.

Figure 7:
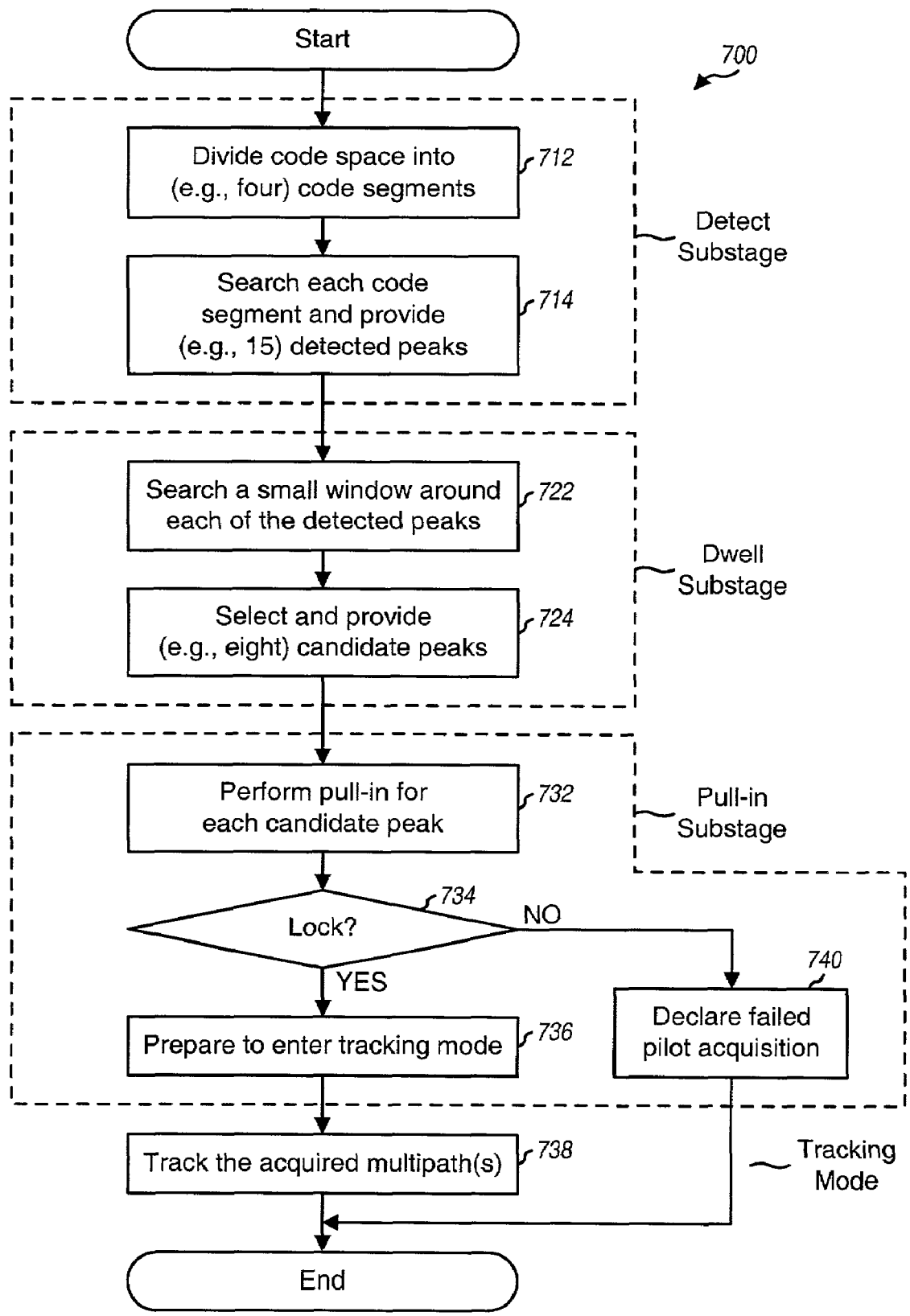

FIG. 7 is a flow diagram of an embodiment of a process 700 that may be used to search for, acquire, and track pilots in a CDMA system. Process 700 includes three substages—detect, dwell, and pull-in. The detect and dwell substages perform a search for peaks over a designated code space, and the pull-in substage performs acquisition of candidate peaks over frequency errors. Each peak is indicative of a possible strong multipath in the received signal. Process 700 further includes the tracking mode whereby acquired multipath(s) are tracked.

For the detect substage, the entire code space to be searched is initially divided into a number of code segments, at step 712. As an example for a full search in IS-95 and cdma2000, the entire code space of 32,768 PN chips may be divided into four code segments, with each code segment including 8192 PN chips. In an embodiment, the four code segments may be searched in parallel by four search units within the searcher (each search unit may be implemented as shown in FIG. 3 for searcher 310). Each code segment is then searched and a particular number of (e.g., 15) largest peaks found in the code segment are provided as the detected peaks, at step 714.

For the dwell substage, a search is performed over a small window (e.g., 5 PN chips) centered at each of the detected peaks, at step 722. A particular number of largest peaks from all searches in the dwell substage are then selected and provided as the candidate peaks, at step 724. The number of candidate peaks provided by the dwell substage may be equal to the number of finger processors available for use for acquisition (i.e., $M_{dw}=M_f$), although more or fewer candidate peaks may also be provided. In a specific embodiment, a set of $M_{dw}=8$ candidate peaks is provided by the dwell substage for $M_f=8$ finger processors.

For the pull-in substage, a finger processor is initially assigned to each candidate peak, and each finger processor attempts to acquire and lock to the frequency and timing of the assigned peak, at step 732. The acquisition of each multipath's frequency may be achieved by operating the finger processor in the RAFC mode (acquisition of the multipath timing may be achieved by a time control loop that may also be included in the finger processor but is not shown in FIG. 3 for simplicity). If a lock to at least one candidate peak is achieved, as determined in step 734 and described below, then successful pilot acquisition is declared and preparation is made to enter a tracking mode, at step 736. The acquired multipath(s) may then be tracked by operating the enabled finger processors in the RVAFC mode, at step 738. Otherwise, if lock is not achieved at step 734, then acquisition failure is declared, at step 740, and other actions may be performed. In either case, the process terminates.

The detect, dwell, and pull-in substages in FIG. 7 form a basic stage that may be used to implement numerous pilot acquisition schemes. The three substages and various pilot acquisition schemes are described in further detail in U.S. patent application Ser. No. 09/971,903 entitled "METHOD AND APPARATUS FOR ACQUIRING PILOTS OVER CODE SPACE AND FREQUENCY ERRORS IN A CDMA COMMUNICATION SYSTEM," filed Oct. 4, 2001, assigned to the assignee of the present application and incorporated herein by reference.

Figure 8:
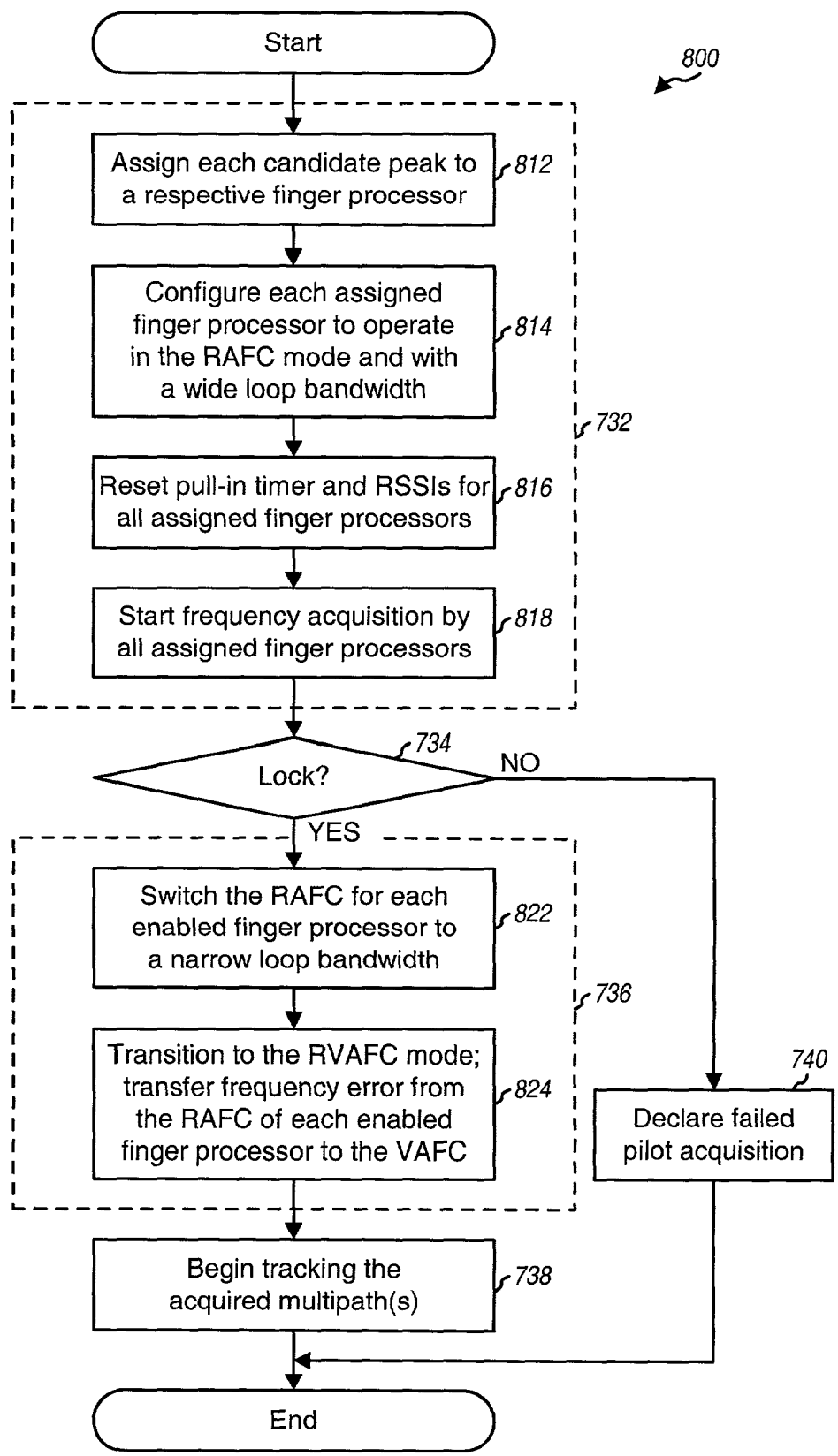
FIG. 8 is a flow diagram of an embodiment of a process to acquire and track pilots, which shows a pull-in substage in more detail.

FIG. 8 is a flow diagram of an embodiment of a process 800 to acquire and track pilots, which shows the pull-in substage in more detail. Initially, each candidate peak from the dwell substage is assigned to a respective finger processor, at step 812. If $M_f$ finger processors are available, then pull-in may be performed concurrently on up to $M_f$ candidate peaks. Each assigned finger processor is then configured to operate in the RAFC mode (by closing switch S2) and with a wide loop bandwidth (e.g., loop mode 2), at step 814.

During initial acquisition, the frequency error observed on each assigned multipath can arise from two main sources: (1) error in the oscillator used to derive the downconversion frequency and (2) Doppler frequency error on the multipath. The oscillator frequency error is typically 5 KHz or less and is common to all assigned multipaths. The Doppler frequency error is typically less than 1 KHz for most applications (including a high-speed train moving at 500 km/hr), but may be different for each multipath. The oscillator is typically used to derive both the downconversion frequency for the receive path and the upconversion frequency for the transmit path. In this case, since the oscillator frequency error affects both the receive and transmit paths, it is desirable to correct as much of this frequency error as possible during the initial acquisition.

The oscillator frequency control, $L_{osc}$, is thus initially set to a particular value that provides a nominal (expected) downconversion frequency. This nominal downconversion frequency may be determined during prior acquisitions, e.g., by sampling the value in the VAFC loop accumulator every so often (e.g., every 30 seconds) and storing the sampled value in a table. The very first time the terminal is powered on, the value provided to the VAFC loop accumulator may be a default value (e.g., determined during manufacturing). And for each subsequent acquisition, the VAFC loop accumulator may be seeded with the value stored in the table during a prior acquisition. If the stored value is accurate, then the frequency error observed by each finger processor would be approximately equal to the Doppler frequency error on the assigned multipath.

During the initial acquisition, the VAFC is disabled by opening switches S1 and S3. With only the RAFC enabled, the rotator in each finger processor is used to acquire the frequency error in the assigned multipath, as observed by the finger processor.

In an embodiment, the pull-in substage is performed for a particular time interval, $T_{pull-in}$, and a timer is reset to this value at the start of the pull-in substage, at step 816. The pull-in time interval, $T_{pull-in}$, is common to all assigned finger processors, and may be selected based on various considerations (e.g., 50 msec). In an embodiment, a received signal strength indicator (RSSI) is used to measure the signal strength (or energy) of the pilot being recovered by each assigned finger processor, and the RSSI is reset to a particular value (e.g., −30 dB) at the start of the pull-in substage, also at step 816. The RSSI may be implemented in each finger processor (not shown in FIG. 3) or, alternatively, the pilot energy computation may be performed by controller 260 or some other unit.

Once the pull-in timer and RSSIs have been reset, the finger processors start frequency (and timing) acquisition of the candidate peaks corresponding to the assigned multipaths. As the RAFC of each finger processor attempts to acquire the frequency error of the assigned multipath, the RSSI output is monitored. A determination is then made whether or not frequency acquisition has been achieved on at least one assigned multipath, at step 734. Successful frequency acquisition may be declared when the RSSI output of at least one finger processor crosses a particular lock threshold (e.g., −20 dB) before the pull-in timer expires. In an embodiment, the finger processor with the highest RSSI output is declared as the candidate for system acquisition. In another embodiment, all finger processors with RSSI outputs above the lock threshold may be declared as candidates for system acquisition. Conversely, if the RSSI outputs of all assigned finger processors remain below the lock threshold at the end of the pull-in time interval, $T_{pull-in}$, then the pull-in substage is terminated with a declaration of an acquisition failure, at step 740.

Alternatively or additionally, successful frequency acquisition may be declared by a frequency error estimator that estimates the amount of residual frequency error in the frequency-translated data samples in each assigned finger processor by filtering the normalized CPD output (e.g., with an infinite impulse response (IIR) filter). When the frequency error estimate for a particular finger processor falls below a threshold set equal to the pilot filter bandwidth, then successful acquisition is declared on that finger processor.

Successful frequency acquisition may thus be declared on one or multiple finger processors (e.g., the one with the highest RSSI output). If successful frequency acquisition is declared at step 734, then the RAFC of each finger processor enabled for tracking is switched to a narrow loop bandwidth (e.g., loop mode 0), at step 822. A transition is then made from the RAFC mode to the RVAFC mode (by closing switches S1 and S3 for each enabled finger processor), and the frequency error from the RAFC loop accumulator of each enabled finger processor is transferred to the VAFC loop accumulator, at step 824. In one embodiment, the content of the RAFC loop accumulator is transferred to the VAFC loop accumulator via switch S3 and gain element 538, which ensures a smooth transition since the frequency error is incrementally accumulated by VAFC loop accumulator 544. In another embodiment, the content of the RAFC loop accumulator is transferred by loading (or directly writing) to the VAFC loop accumulator (after any scaling, if necessary), which provides a fast transition. The enabled finger processor then operates in the tracking mode and the acquired multipath is tracked in the RVAFC mode, at step 738.

System acquisition may thereafter be performed on each of one or more acquired multipaths. Whereas the initial acquisition is performed to acquire and track the frequency and timing of the multipaths, the system acquisition attempts to demodulate and decode certain code channels (e.g., sync and/or paging channels) to recover data and/or messages that may be directed the terminal. In one embodiment, the system acquisition is performed for the multipath with the best RSSI output that exceeds the lock threshold at the end of the pull-in time interval. In another embodiment, the system acquisition is performed for multiple multipaths that exceed the lock threshold at the end of the pull-in time interval. For this embodiment, multiple multipaths from multiple base stations may be combined (if "soft handoff" is used and data is redundantly transmitted from multiple base stations) to obtain improved performance, or multiple multipaths from a single base station may be combined (if "softer handoff" is used and data is not transmitted from multiple base stations, as for the paging channel in IS-95 and cdma2000.

Certain acquisition information may be retained (temporarily stored) for the acquired multipaths not selected for system acquisition. Such information may include, for example, the PN phase, frequency error, RSSI output, and so on, for the multipath. This acquisition information may be recalled later and used for various functions such as, for example, as an aid in quick hand-off after system acquisition.

In the RVAFC mode, the oscillator is gradually moved by the RVAFC to the average frequency of all acquired multipaths being processed by the enabled finger processors. In the case of a single enabled finger processor, the oscillator gradually moves to the frequency of this single acquired multipath, and the frequency error in both the RAFC loop accumulator and the phase rotated data samples gradually moves toward 0 Hz as the VAFC corrects for any frequency error in the multipath by adjusting the frequency of the oscillator.

Initially, tracking may be performed on a single multipath for which initial acquisition was successful. During normal operation, new multipaths may continually arise in the received signal due to changes in the communication link and/or movement by the terminal. The searcher is typically operated to continually search for new multipaths, and initial acquisition may be attempted on each new multipath of sufficient strength. Upon successful initial acquisition of the new multipath, the frequency error contributions from the RAFC of the finger processor assigned with the newly acquired multipath may be added to the RVAFC.

Figure 9:
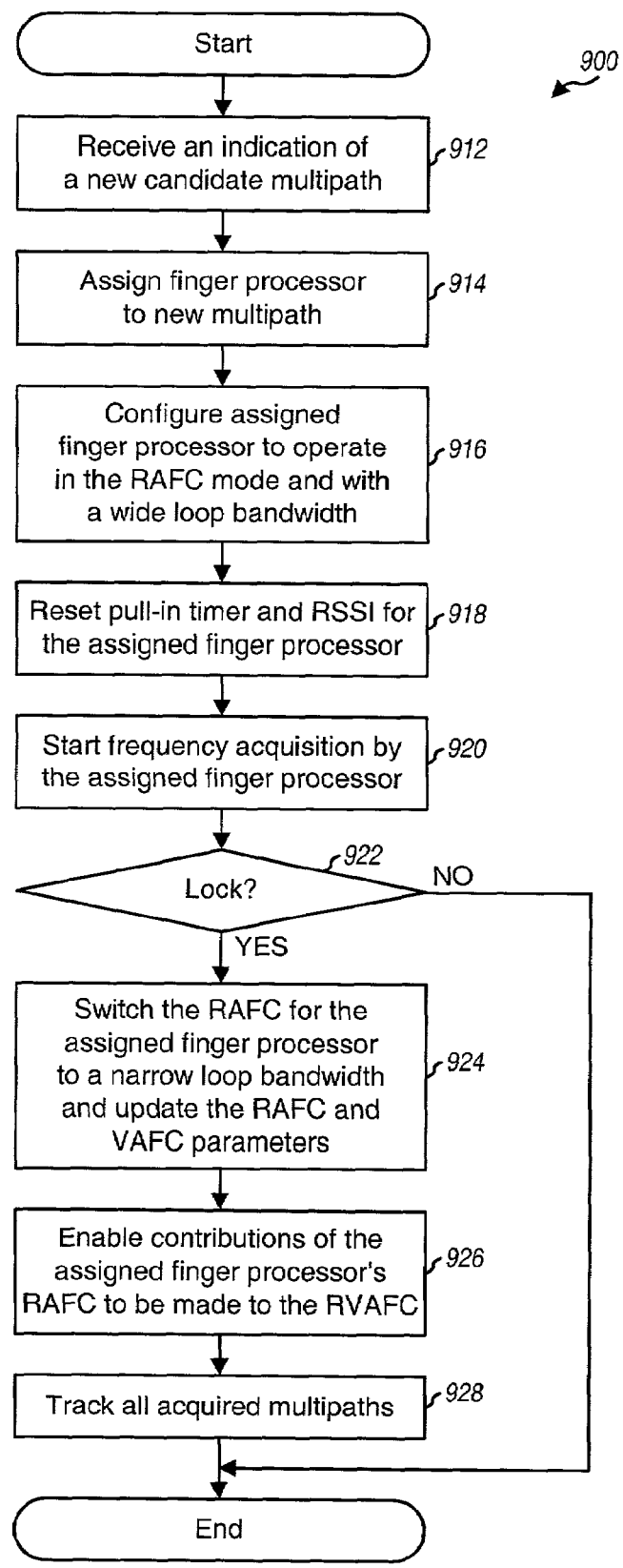
FIG. 9 is a flow diagram of an embodiment of a process to acquire a new multipath and to add this multipath for tracking.

FIG. 9 is a flow diagram of an embodiment of a process 900 to acquire a new multipath and to add this multipath for tracking. Initially, an indication is received of a new candidate multipath for frequency acquisition, at step 912. The new multipath may be found by the searcher, and a particular algorithm may be used to determine whether or not to process this multipath. If the algorithm decides to process the new multipath, then a finger processor is assigned to the multipath, at step 914, and the assigned finger processor is configured to operate in the RAFC mode (by closing switch S2) and with a wide loop bandwidth (e.g., loop mode 2), at step 916. The contributions from the RAFC of this finger processor are not provided to the RVAFC (which is currently tracking the average frequency of all prior acquired multipaths) by opening switches S1 and S3 for this RAFC.

The pull-in timer is then reset to the pull-in time interval, $T_{pull-in}$, and the RSSI for the newly assigned finger processor is reset to a particular value (e.g., between a lower-lock threshold and an upper-lock threshold), at step 918. Searching during the tracking mode is more reliable than the initial search because the oscillator frequency error is substantially removed at this point, which then allows the searcher to use a longer integration interval that results in improved probability of detection. Thus, the RSSI may be reset to a value closer to the lock threshold than the −30 dB value used for the initial acquisition. The finger processor then starts frequency acquisition of the new multipath, at step 920. As the RAFC of the finger processor attempts to acquire the frequency error of the new multipath, the RSSI output is monitored. A determination is then made whether or not frequency acquisition has been achieved on the new multipath, at step 922. Successful frequency acquisition may be declared if the RSSI output the finger processor crosses the upper-lock threshold before the pull-in timer expires.

If successful frequency acquisition is declared, then the RAFC of the finger processor is switched to a narrow loop bandwidth (e.g., loop mode 0), at step 924. The parameters for the RAFC and VAFC are also updated (e.g., by incrementing the number of enabled finger processors). The contributions from the finger processor's RAFC to the RVAFC are enabled by closing switches S1 and S3 for this RAFC, at step 926. The finger processor for the newly acquired multipath then operates in the tracking mode, and all acquired multipaths are tracked based on the RVAFC mode, at step 928.

The oscillator is then gradually moved by the RVAFC to the average frequency of all acquired multipaths such that the average of the frequency errors accumulated by the RAFC loop accumulators of the enabled finger processors approaches zero. The frequency error on the frequency-translated data samples for each enabled finger processor gradually moves toward 0 Hz as the VAFC corrects the average frequency error by adjusting the frequency of the oscillator and the RAFC corrects the residual frequency error on each multipath by adjusting the frequency of the rotator.

Figure 10:
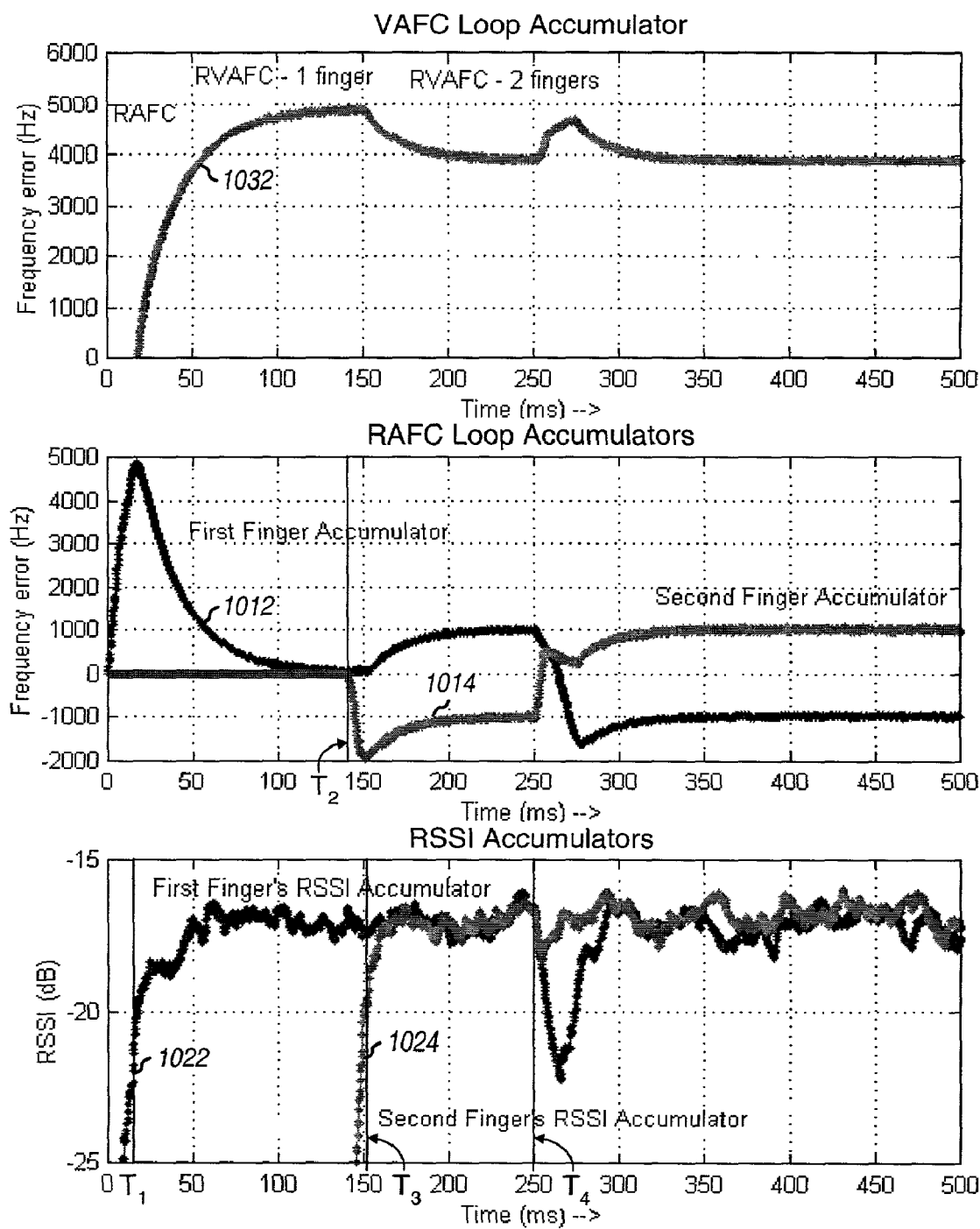
FIG. 10 shows plots of the pilot acquisition and tracking for an example scenario.

FIG. 10 shows plots of the pilot acquisition and tracking for an example scenario. In this example, the oscillator has an initial frequency error of 4 KHz when the terminal is powered on. The detect and dwell substages provide one candidate multipath (e.g., at −18 dB) with a Doppler frequency error of 1 KHz. This candidate multipath is assigned to a first finger processor. For the pull-in substage, the first finger processor is configured to operate in the RAFC mode and the VAFC is disabled.

As shown by plot 1012, the RAFC of the first finger processor starts at zero and acquires the total frequency error of 5 KHz in the multipath (i.e., 4 KHz for the oscillator frequency error plus 1 KHz for the Doppler frequency error) at approximately time $T_1$, which is within approximately 20 msec of the start of the pull-in substage. When the RSSI output of the first finger processor (plot 1022) crosses the upper-lock threshold (e.g., −20 dB) at time $T_1$, successful acquisition is declared on that finger processor. The RVAFC mode is then enabled and the content of the RAFC loop accumulator is transferred to the VAFC loop accumulator. As a result, the VAFC loop accumulator starts to move toward 5 KHz (plot 1032) while the RAFC loop accumulator correspondingly moves toward 0 Hz. Since the VAFC has a more narrow loop bandwidth than the RAFC, the time constant for plot 1032 (to reach 5 KHz) is longer than the time constant for plot 1012 (to reach the same 5 KHz).

At time $T_2$ (which is at approximately 145 msec), the searcher finds a new multipath (e.g., at −17 dB) having a Doppler frequency error of −1 KHz. This new multipath is assigned to a second finger processor. The RAFC of the second finger processor is enabled but the contributions from this RAFC to the VAFC are not enabled.

Between times $T_2$ and $T_3$ ($T_3$ is when successful acquisition is declared on the second finger processor), the VAFC continues to correct the oscillator frequency error of 4 KHz plus the Doppler frequency error of 1 KHz for the first multipath. The effective total frequency error observed by the second finger processor for the new multipath is thus −2 KHz. The RAFC of the second finger processor starts at zero and acquires the total frequency error of −2 KHz for the new multipath at approximately time $T_3$ (plot 1014).

When the RSSI output of the second finger processor (plot 1024) crosses the upper-lock threshold (e.g., −20 dB) at time $T_3$, successful acquisition is declared on that finger processor. The contributions from the second finger processor's RAFC to the VAFC are enabled (by closing switches S1 and S3), and the VAFC then moves to correct the average frequency error for the two multipaths, which is 4 KHz. Correspondingly, the RAFCs for first and second finger processors move toward the residual frequency errors of +1 KHz and −1 KHz, respectively, for their assigned multipaths.

For a fast-moving terminal (e.g., one in a high-speed train moving at 500 km/hr), the Doppler frequency error may be as large as 1 KHz in the PCS band. Moreover, the sign of the Doppler frequency error flips as the terminal passes a base station.

In the example shown in FIG. 10, the Doppler frequency error for the first multipath flips from +1 KHz to −1 KHz at time $T_4$ and the Doppler frequency error for the second multipath flips from −1 KHz to +1 KHz at the same time. Each finger processor thus effectively observes a 2 KHz step change in the frequency error on its assigned multipath at time $T_4$.

When a sudden change in frequency error occurs (e.g., due to the flip in Doppler frequency error), the RAFC of each finger processor initially attempts to acquire the new frequency error. As the frequency error is accumulated by the RAFC of each finger processor, it is transferred to the VAFC loop accumulator via switch S3. This then ensures that the VAFC (eventually) tracks the average frequency error while the RAFC tracks the residual frequency error.

As shown in FIG. 10, shortly after time $T_4$, the RAFC for the second finger processor is able to quickly acquire the +2 KHz change in the Doppler frequency error, while the RAFC for the first finger processor requires a longer time period to acquire the −2 KHz change in the Doppler frequency error. This difference in acquisition time may be due to various factors such as, for example, the received signal quality, a larger frequency error in one finger processor, and so on. Shortly after the second finger processor acquires the +2 KHz change and settles at the new frequency error of +1 KHz, the VAFC moves toward the new average frequency error of approximately 4.5 KHz since the RAFC for the second finger processor has not yet acquired its new frequency error. And shortly after the RAFC for the second finger processor acquires the −2 KHz change and settles at the new frequency error of −1 KHz, the VAFC moves toward the new average frequency error of 4 KHz. The RAFC for each enabled finger processor then continues to track its residual frequency error.

Loop Performance

The model shown in FIG. 5 represents a multi-input multi-output system. The inputs are the multipath frequencies ($F_m$, for $m=1, 2, \ldots M_f$) and the outputs are the VAFC's frequency estimate ($\hat{F}_{osc}$) and the RAFCs' frequency error estimates ($\hat{F}_{rot,m}$, for $m=1, 2, \ldots M_f$).

The transfer function between the inputs and the VAFC's frequency estimate may be expressed as:

$$\hat{F}_{osc} = \frac{H_a H_b H_c}{1 + M_f H_a H_b H_c} \cdot \sum_{m=1}^{M_f} F_m \quad \text{Eq (1)}$$

$$= K_f \cdot \frac{[z^{-1} - (1 - C_0 K_e)z^{-2}] \cdot \left(\frac{1}{M_f} \sum_{m=1}^{M_f} F_m\right)}{1 + (K_e - 2 + K_f)z^{-1} + [1 - K_e - K_f(1 - C_0 K_e)]z^{-2}}$$

where $$H_a = \frac{K_e z^{-1}}{1 - (1 - K_e)z^{-1}},$$

$$H_b = \frac{1 + (C_0 K_{RAFC} - 1)z^{-1}}{K_0 K_{RAFC} z^{-1}},$$

$$H_c = \frac{\mu_{osc} K_0 K_{VAFC} z^{-1}}{(1 - z^{-1})M_f},$$

$$K_e = 2\pi N T_c K_0 K_{RAFC} K_{CPD},$$

$$K_{CPD} = \frac{Ma}{a^2 + 2b^2 \sigma_n^2}, \text{ and}$$

$$K_f = \frac{K_e \mu_{osc} K_{VAFC}}{K_{RAFC}}.$$

As shown in equation 1, the poles of the RVAFC are a function of the following parameters: (1) the gain of the RAFC, $K_{RAFC}$, (2) the gain of the VAFC, $K_{VAFC}$, (3) the transfer gain of the RAFC loop accumulator to the RVAFC, $C_0$, (4) the AFC loop mode (M, N), (5) the oscillator sensitivity, $\mu_{osc}$, and (6) the pilot $E_c/I_o$. Of these parameters, the first four are design choices while the last two are external parameters that vary over specified ranges (e.g., $\mu_{osc} \epsilon [1\ 2]/1.5$ and $E_c/I_o \epsilon [-2\ -18]$ dB). By selecting the proper values for the first four parameters, stability of the RVAFC over the entire specified ranges for the last two parameters may be achieved. In a specific implementation, the values may be selected as follows: the RAFC gain $K_{RAFC} = 1/16$, the VAFC gain $K_{VAFC} = 1/16$, and the transfer gain $C_0 = 1/4$. A small transfer gain, $C_0$, slows down the transfer of the frequency error from the RAFC to the VAFC but ensures stability.

As shown in equation (1), the oscillator output variable, $\hat{F}_{osc}$, is a function of the sum of the input variables, $\Sigma F_m$.

Under steady state, when the frequency errors on all enabled finger processors are constant, then equation (1) reduces to the following form:

$$\hat{F}_{osc}(\text{steady state} \Rightarrow z = 1) = \frac{1}{M_f}\sum_{m=1}^{M_f} F_m. \quad \text{Eq (2)}$$

Thus, in steady state, the oscillator settles at the arithmetic mean of the input frequency variables. For the more general case of unequal pilot strengths, the normalized CPD outputs from the RAFCs are typically not equal because the discriminator gain is a function of (and is typically proportion to) the pilot $E_c/I_o$. In this case, the oscillator will settle at the weighted mean of the input frequency variables.

The individual rotator corrections for the RAFC of each finger processor may be derived from FIG. 5 and equation 2, as follows:

$$\hat{F}_{rot,m} = H_a(F_m - \hat{F}_{osc}) \quad \text{Eq (3)}$$

$$= H_a \cdot \left(F_m - \frac{H_a H_b H_c}{1 + M_f H_a H_b H_c} \cdot \sum_{m=1}^{M_f} F_m\right).$$

For clarity, the inventive techniques have been described for the acquisition and tracking of pilots. In general, these techniques may be used to acquire and track any type of signal. To achieve this, the processing by the finger processor would be complementary to that performed at the transmission source for the signal to be acquired and tracked. The inventive techniques may also be used for pilots that are gated, in which case the searcher and finger processors are appropriately timed such that the processing is performed on the pilot portions.

Also for clarity, various aspects and embodiments of the invention have been described for the forward link in IS-95 and cdma2000. The techniques described herein may also be adapted for use on the reverse link. In IS-95 and cdma2000, each terminal is assigned a scrambling code used to distinguish that terminal. The scrambling code is combined (or multiplied) with the PN sequence to provide a spreading sequence that is used to spread the data prior to transmission to the base station. The acquisition of the signals from the transmitting terminals may be achieved by searching over a particular code space for each terminal to provide candidate peaks. Pull-in may thereafter be performed to acquire the frequency of the candidate peaks.

The techniques described herein may also be adapted for use in other CDMA systems, such as W-CDMA systems. Some of the processing in W-CDMA is different from that for IS-95 and cdma2000. For example, "covering" with a Walsh code in IS-95 and cdma2000 is equivalent to "spreading" with an orthogonal variable spreading factor (OVSF) code in W-CDMA, and "spreading" with the PN sequence in IS-95 and cdma2000 is equivalent to "scrambling" with a scrambling sequence in W-CDMA. The techniques described herein may be adapted to account for the difference in signal processing and the difference in the pilot transmission.

The pilot acquisition and tracking techniques described herein may be implemented by various means. For example, these techniques may be implemented in hardware, software, or a combination thereof. For a hardware implementation, the elements used for pilot acquisition and tracking (e.g., the finger processors and some or all elements of the RAFC and VAFC) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the elements used for pilot acquisition and tracking may be implemented with modules (e.g., procedures, functions, and so on) that perform the functions described herein. The software codes may be stored in a memory unit (e.g., memory 262 in FIG. 2) and executed by a processor (e.g., controller 260). The memory unit may be implemented within the processor or external to the processor, in which case it can be communicatively coupled to the processor via various means as it known in the art.

The elements used to implement the pilot acquisition and tracking techniques described herein may be incorporated in a receiver unit or a demodulator that may further be incorporated in a terminal (e.g., a handset, a handheld unit, a stand-alone unit, and so on), a base station, or some other communication devices or units. The receiver unit or demodulator may be implemented with one or more integrated circuits.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system, a method of acquiring signal instances in a received signal, comprising:
    acquiring a frequency of each of a plurality of candidate signal instances with a respective first frequency control loop at a receiver;
    detecting acquisition on at least two of the plurality of candidate signal instances; and
    tracking an average frequency of the at least two acquired signal instances with a second frequency control loop, wherein the at least two acquired signal instances correspond to at least two multipaths suitable for combining at the receiver.

2. The method of claim 1, further comprising;
    tracking a residual frequency error between the average frequency and the frequency of each acquired signal instance with the first frequency control loop for the acquired signal instance.

3. The method of claim 1, further comprising:
    transferring a frequency error of each acquired signal instance from the first frequency control loop to the second frequency control loop.

4. The method of claim 3, wherein the transferring the frequency error of each acquired signal instance comprises
    scaling an output of a first accumulator for the first frequency control loop, the first accumulator output being indicative of the frequency error for the acquired signal instance, and providing the scaled first accumulator output to a second accumulator for the second frequency control loop.

5. The method of claim 3, wherein the transferring the frequency error of each acquired signal instance comprises providing to an accumulator for the second frequency control loop a discriminator value derived from the first frequency control loop used for the acquired signal instance.

6. The method of claim 3, wherein the transferring the frequency error of each acquired signal instance comprises coupling a loop accumulator output for the first frequency control loop to a loop accumulator input for the second frequency control loop.

7. The method of claim 1, further comprising:
downconverting the received signal with a downconversion signal having the average frequency determined by the second frequency control loop;
digitizing the downconverted received signal to generate data samples; and
for each acquired signal instance, frequency translating the data samples based on the frequency determined by the first frequency control loop for the acquired signal instance.

8. The method of claim 1, further comprising:
disabling the second frequency control loop during the acquisition of the plurality of candidate signal instances.

9. The method of claim 1, further comprising:
enabling the first frequency control loop for each acquired signal insurance and the second frequency control loop during the tracking of the at least two acquired signal instances.

10. The method of claim 1, wherein the average frequency is derived via a uniform weighting of frequencies of the at least two acquired signal instances.

11. The method of claim 1, wherein the average frequency is derived via a non-uniform weighting of frequencies of the at least two acquired signal instances such that the frequency of a stronger acquired signal instance is weighted more than the frequency of a weaker acquired signal instance.

12. The method of claim 1, further comprising:
operating the first and second frequency control loops in one of a plurality of loop modes.

13. The method of claim 12, further comprising:
setting the first frequency control loop for each candidate signal instance to a first loop mode having a wider loop bandwidth for acquisition.

14. The method of claim 12, further comprising:
setting the first frequency control loop for each acquired signal instance to a second loop mode having a narrower loop bandwidth for tacking.

15. The method of claim 12, further comprising:
deriving inputs used to detect frequency error in each candidate signal instance based on a first processing scheme; and
deriving inputs used to detect frequency error in each acquired signal instance based on a second processing scheme.

16. The method of claim 1, wherein the acquisition is performed concurrently on the plurality of candidate signal instances.

17. The method of claim 1, wherein the detecting acquisition on the at least two of the plurality of candidate signal instances comprises
deriving at least one detector output for each candidate signal instance, and
declaring acquisition for the candidate signal instance if the at least one detector ouput exceeds a particular threshold value within a particular time interval.

18. The method of claim 1, wherein acquisition on each candidate signal instance is detected with a received signal strength indicator (RSSI) derived for the candidate signal instance.

19. The method of claim 1, wherein acquisition on each candidate signal instance is detected using a frequency error estimator that estimates the amount of residual frequency error in frequency-translated data samples for the candidate signal instance.

20. The method of claim 17, further comprising:
performing system acquisition on an acquired signal instance having a best detector output that exceeds the particular threshold value within the particular time interval.

21. The method of claim 20, further comprising:
retaining acquisition information far each acquired signal instance for which system acquisition is not performed.

22. The method of claim 1, further comprising:
performing system acquisition on the at least two acquired signal instances.

23. The method of claim 22, further comprising:
combining demodulated symbols for the at least two acquired signal instances.

24. The method of claim 1, further comprising:
acquiring a frequency of each of one or more additional candidate signal instances based on a respective first frequency control loop.

25. The method of claim 24, further comprising:
omitting from the second frequency control loop contributions from the first frequency control loop for each additional candidate signal instance during the acquisition of the additional candidate signal instance.

26. The method of claim 24, further comprising:
detecting acquisition on at least one additional candidate signal instance; and
tracking the average frequency of the at least two acquired signal instances and the at least one additional acquired signal instance with the second frequency control loop.

27. The method of claim 1, wherein each first frequency control loop includes a rotator operative to frequency translate a signal instance.

28. The method of claim 1, further comprising:
looking an oscillator to the average frequency.

29. The method of claim 1, wherein the communication system is a code division multiple access (CDMA) system.

30. The method of claim 29, wherein the CDMA system conforms to the IS-95 or cdma2000 standard.

31. The method of claim 29, wherein the CDMA system conforms to the W-CDMA or TS-CDMA standard.

32. A method of acquiring pilots in a code division multiple access (CDMA) communication system, comprising:
acquiring a frequency of each of a plurality of candidate signal instances with a respective first frequency control loop at a receiver;
detecting acquisition on at least two of the plurality of candidate signal instances, wherein the at least two acquired signal instances correspond to at least two multipaths suitable for combining at the receiver;
transferring a frequency error of each of the at least two acquired signal instances from the first frequency control loop to a second frequency control loop;

tracking an average frequency of the at least two acquired signal instances with the second frequency control loop; and tracking a residual frequency error between the average frequency and the frequency of each acquired signal instance with the first frequency control loop for the acquired signal instance.

33. The method of claim 32, further comprising:

acquiring a frequency of each of one or more additional candidate signal instances based on a respective first frequency control loop;

detecting acquisition on at least one additional candidate signal instance; and tracking the avenge frequency of the at least two acquired signal instances and the at least one additional acquired signal instance with the second frequency control loop.

34. In a wireless communication system, a method of acquiring signal instances in a received signal, comprising:

acquiring a frequency of each of a plurality of candidate signal instances at a receiver;

detecting frequency acquisition on at least two of the plurality of candidate signal instances based on at least one detector, wherein the at least two acquired signal instances correspond to at least two multipaths suitable for combining at the receiver;

performing system acquisition on an acquired signal instance having a best detector output among the at least two acquired signal instances; and retaining frequency acquisition information for each acquired signal instance for which system acquisition is not performed.

35. The method of claim 34, wherein the detecting frequency acquisition on the at least two of the plurality of candidate signal instances comprises declaring acquisition for each candidate signal instance for which a detector output for the candidate signal instance exceeds a particular threshold value within a particular time interval.

36. The method of claim 34, wherein system acquisition is performed on the at least two acquired signal instances.

37. A receiver unit in a wireless communication system, comprising:

a plurality of finger processors operative to acquire frequency of a plurality of candidate signal instances in a received signal with a plurality of first frequency control loops;

at least one detector operative to detect acquisition on at least two of the plurality of candidate signal instances, wherein the at least two acquired signal instances correspond to at least two multipaths suitable for combining at the receiver unit; and a second frequency control loop operative to track an average frequency of the at least two acquired signal instances.

38. The receiver unit of claim 37, wherein the plurality of finger processors are further operative to track residual frequency error of each acquired signal instance with the first frequency control loop for the acquired signal instance.

39. The receiver unit of claim 37, further comprising:

a searcher operative to search for signal instances in the received signal and to provide the plurality of candidate signal instances.

40. The receiver unit of claim 37, wherein the each finger processor includes a rotator operative to frequency translate a signal instance assigned to the finger processor.

41. The receiver unit of claim 37, further comprising:

an oscillator having a frequency determined by the second frequency control loop and serving as a reference to derive the frequency used for downconversion of the received signal from radio frequency to baseband.

42. A terminal in a code division multiple access (CDMA) system comprising:

a plurality of finger processors operative to acquire frequency of a plurality of candidate signal instances in a received signal with a plurality of first frequency control loops;

at least out detector operative to detect acquisition on at least two of the plurality of candidate signal instances, wherein the at least two acquired signal instances correspond to at least two multipaths suitable for combining at the terminal; and a second frequency control loop operative to track an average frequency of the at least two acquired signal instances.

43. The terminal of claim 42, wherein the plurality of finger processors are further operative to track residual frequency error of each acquired signal instance with the first frequency control loop for the acquired signal instance.

44. The terminal of claim 42, further comprising:

a searcher operative to search for signal instances in the received signal and to provide the plurality of candidate signal instances.

45. The terminal of claim 42, wherein the each finger processor includes a rotator operative to frequency translate a signal instance assigned to the finger processor.

46. The terminal of claim 42, wherein the second frequency control loop is operative to adjust downconversion of the received signal twin radio frequency to baseband.

* * * * *